United States Patent
Telljohann et al.

(10) Patent No.: US 9,645,572 B2
(45) Date of Patent: May 9, 2017

(54) DEVICE CLASS INFORMATION SUPPORT FOR MULTI-OPTION DEVICES

(71) Applicant: Rockwell Automation Technologies, Inc., Mayfield Heights, OH (US)

(72) Inventors: Patrick D. Telljohann, Solon, OH (US); Scott A. Pierce, Concord Township, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 664 days.

(21) Appl. No.: 14/074,374

(22) Filed: Nov. 7, 2013

(65) Prior Publication Data

US 2015/0127120 A1    May 7, 2015

(51) Int. Cl.

| | | |
|---|---|---|
| *G05B 15/00* | (2006.01) | |
| *G05B 11/01* | (2006.01) | |
| *G06F 11/00* | (2006.01) | |
| *H04N 1/04* | (2006.01) | |
| *G05B 19/418* | (2006.01) | |
| *G05B 19/042* | (2006.01) | |

(52) U.S. Cl.
CPC ..... *G05B 19/4185* (2013.01); *G05B 19/0426* (2013.01); *G05B 2219/32144* (2013.01); *G05B 2219/33112* (2013.01)

(58) Field of Classification Search
USPC ............. 358/474; 714/48; 710/106; 191/78
See application file for complete search history.

(56) References Cited

U.S. PATENT DOCUMENTS

| | | | |
|---|---|---|---|
| 6,088,624 A | * | 7/2000 | Khan ................ G05B 19/0423 700/19 |
| 6,618,630 B1 | | 9/2003 | Jundt et al. |
| 7,565,351 B1 | | 7/2009 | Callaghan |
| 7,657,404 B2 | | 2/2010 | Thurner |
| 7,672,737 B2 | | 3/2010 | Hood et al. |

(Continued)

FOREIGN PATENT DOCUMENTS

| | | |
|---|---|---|
| EP | 1770459 A2 | 4/2007 |
| WO | 03/029907 A1 | 4/2003 |

OTHER PUBLICATIONS

Extended European Search Report dated Sep. 3, 2015; Application No. 14191784.9—(7) pages.

(Continued)

*Primary Examiner* — Mohammad Ali
*Assistant Examiner* — Md Azad
(74) *Attorney, Agent, or Firm* — Boyle Fredrickson, SC

(57) ABSTRACT

A system for defining information for multi-option devices connected to an industrial network is disclosed. Each device has a single electronic data sheet (EDS) defining options associated with the device as well as each of the choices associated with those options. An option data sheet (ODS) is included for each option defining the device information corresponding to that option. A programmer interface may allow a programmer to select devices as well as the options for each of those devices associated with a control system. Each device is also configured to store the EDS and each ODS corresponding to that device within memory in the device. The programmer interface generates a controller configuration file defining the connections between each device and the controller.

14 Claims, 3 Drawing Sheets

(56) References Cited

U.S. PATENT DOCUMENTS

| | | | |
|---|---|---|---|
| 7,716,403 B2 | 5/2010 | Hall | |
| 7,778,713 B2 | 8/2010 | Grgic | |
| 7,831,316 B2 | 11/2010 | Thurner | |
| 7,881,816 B2 | 2/2011 | Mathiesen et al. | |
| 7,984,199 B2 | 7/2011 | Ferguson et al. | |
| 8,392,602 B2 | 3/2013 | VanGompel | |
| 8,712,705 B2 | 4/2014 | Meier et al. | |
| 2007/0076267 A1* | 4/2007 | Pierce | G05B 19/054 358/474 |
| 2008/0300695 A1* | 12/2008 | Bizily | G06Q 10/00 700/17 |
| 2009/0228122 A1* | 9/2009 | Baier | G06F 9/4443 700/83 |
| 2010/0037103 A1 | 2/2010 | Helmecke et al. | |
| 2012/0029661 A1 | 2/2012 | Jones et al. | |

OTHER PUBLICATIONS

Chinese First Search Report issued on Dec. 28, 2016; Chinese Patent Application No. 201410618223.4—(3) pages.

\* cited by examiner

DEVICE CLASS INFORMATION SUPPORT FOR MULTI-OPTION DEVICES

BACKGROUND OF THE INVENTION

The subject matter disclosed herein relates generally to industrial control systems having industrial networks and, more specifically, to a system for configuring the industrial control systems as a function of the devices connected to the industrial network.

As is known to those skilled in the art, industrial control systems are configured to control an industrial machine or process. The control system typically includes an industrial controller connected to an industrial network, which is, in turn, connected to remote devices connected at various locations on the machine or along the process. Industrial controllers are specialized electronic computers providing high reliability operation and real-time control within well-characterized performance standards. The industrial controller is configured to execute a program controlling operation of the machine or process. The industrial controller receives inputs from a portion of the remote devices via the industrial network, processes the inputs, and generates outputs to command operation of another portion of the remote devices via the industrial network. Because the requirements of the controlled machine or process are often customized according to the application requirements, the program must similarly be customized as a function of the remote devices employed by the controlled machine or process.

Many of the variables used in the control program are data received from sensors or commands provided to actuators located on the controlled machine or process and communicating with the industrial controller via the network. This data can be identified numerically, for example, as related to an input of output connection point or to a terminal on the industrial controller. Optionally, development programs executing on a programmer interface allow the programmer to select variable names, or "tags" chosen for mnemonic purposes, to identify the data. As the controlled machines and processes grow more complex, the various sensors and actuators have increased in number and in complexity. With the increased complexity, the devices offer the user a greater number of options which define how the sensor or actuator operates. For example, a manufacturer may provide a sensor having three different options and three choices for each option. As a result, the user may order this one sensor in one of twenty-seven different device definitions. On still more complex devices, there may be ten or more options each having four or five choices, resulting in an exponential increase in the number of potential configurations for a single device. Still other devices may be formed from a base device having slots or other connectors configured to receive pluggable modules or devices. The base device and pluggable devices form a composite device where the number of combinations is limited only by the number of plugs and number of pluggable modules available for the base device. Both the base device and each pluggable device may include a number of options having multiple choices. The number of choices for such a composite device is similarly expansive. Because of the large number of choices and the correspondingly large number of variables on the controller machine or process, identifying the variables numerically or generating a large number of variable names and linking them to the industrial controller can be quite difficult.

Although a configuration program executing, for example, on a programmer interface may be provided to aid the programmer with configuration of the control system, the configuration program has certain drawbacks. Historically, the configuration program has been known to include files, known as Electronic Data Sheets (EDSs), which describe the possible configuration of connections and attributes between a device and the controller or programmer interface. As new devices are added to the control system, the configuration program is updated so that the programmer is always provided with a reference to the types of data available from each component and the meaning of that data. The EDSs may be collected, for example, into a database from which they are subsequently selected. However, because a device may connect to the controller or to other devices differently as a function of the options present on the device and of the choices selected for each option, the EDS must include each of the possible configurations of the device. As previously discussed, the number of potential configurations can grow rapidly, for example, in a composite device. Thus, the number and size of EDSs required in the database has grown as a function of the complexity of the devices.

Thus, it would be desirable to provide an improved system for configuring the control program as well as configuring communication between devices on the industrial network.

BRIEF DESCRIPTION OF THE INVENTION

The subject matter disclosed herein describes a system for defining device information for multi-option devices connected to an industrial network. Each device has a single EDS defining options associated with the device as well as each of the choices associated with those options. An option data sheet (ODS) is included for each choice of each option which defines the device information corresponding to that choice. A programmer interface may be provided to allow a programmer to select devices as well as the options for each of those devices associated with a control system. Each device is also configured to store the EDS and each ODS corresponding to that device within memory included in the device. To facilitate configuration of the control system the programmer interface may also be configured to poll each of the devices connected to the network and to determine whether they are multi-option devices and, if so, additional communications between the programmer interface and the device are performed to determine the specific options supported by the device. The programmer interface generates a controller configuration file defining the configuration of each device and of the connections between each of the devices and the controller in the control system.

According to one embodiment of the invention, an industrial control system for controlling operation of an industrial machine or process is disclosed. The industrial control system includes an industrial network, multiple devices, each device operatively connected to the industrial network and to the industrial machine or process, and an industrial controller operatively connected to the industrial network to communicate with the devices. The industrial control system also includes multiple electronic data sheets and multiple option data sheets. Each electronic data sheet corresponds to one or more of the devices and defines at least one option for the device type, where each option has multiple choices. Each option data sheet corresponds to one of the options defined in the electronic data sheets and defines at least one variable of the device that varies according to the choices selected for the option. A programmer interface is configured to read each of the electronic data sheets, read each of the option data sheets, generate a controller configuration file identifying at least one variable for each option of each device connected to the industrial network, and transmit the controller configuration file to the industrial controller.

According to another embodiment of the invention, a programmer interface for an industrial control system is disclosed. The industrial control system includes a plurality of devices. Each device is operatively connected to an industrial machine or process and is in communication with an industrial network. The programmer interface includes a memory device, a network interface configured to communicate via the industrial network, multiple electronic data sheets stored in the memory device, and multiple option data sheets stored in the memory device. Each electronic data sheet corresponds to one of the devices and defines at least one option for the device, where each option has multiple choices. Each option data sheet corresponds to one of the options defined in the electronic data sheets and defines at least one variable of the device that varies according to choice selected for one of the options. A display is configured to display data to a programmer, an input device is configured to receive input from the programmer, and a processor is configured to execute a program stored in the memory device. The processor generates a configuration file identifying the variables for each option of each device connected to the industrial network.

According to still another embodiment of the invention, a method of configuring communications between a controller and multiple devices is disclosed. The controller and each of the devices are connected via an industrial network, and the controller is configured to execute a program for controlling an industrial machine or process as a function of the devices connected to the controller via the industrial network. A programmer interface is used to identify each of the devices connected to the industrial network, read multiple electronic data sheets, and identify at least one option for each of the devices. Each electronic data sheet corresponds to one of the devices, and each option has multiple choices. The choice selected for each option of each of the devices is determined, and the option data sheets are read. Each option data sheet corresponds to one of the selected choices and defines at least one variable of the device that varies according to the selected choice. The programmer interface generates a controller configuration file for the controller which identifies each of the variables defined in each of the option data sheets corresponding to the choices selected for each of the options of each of the devices connected to the industrial network.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
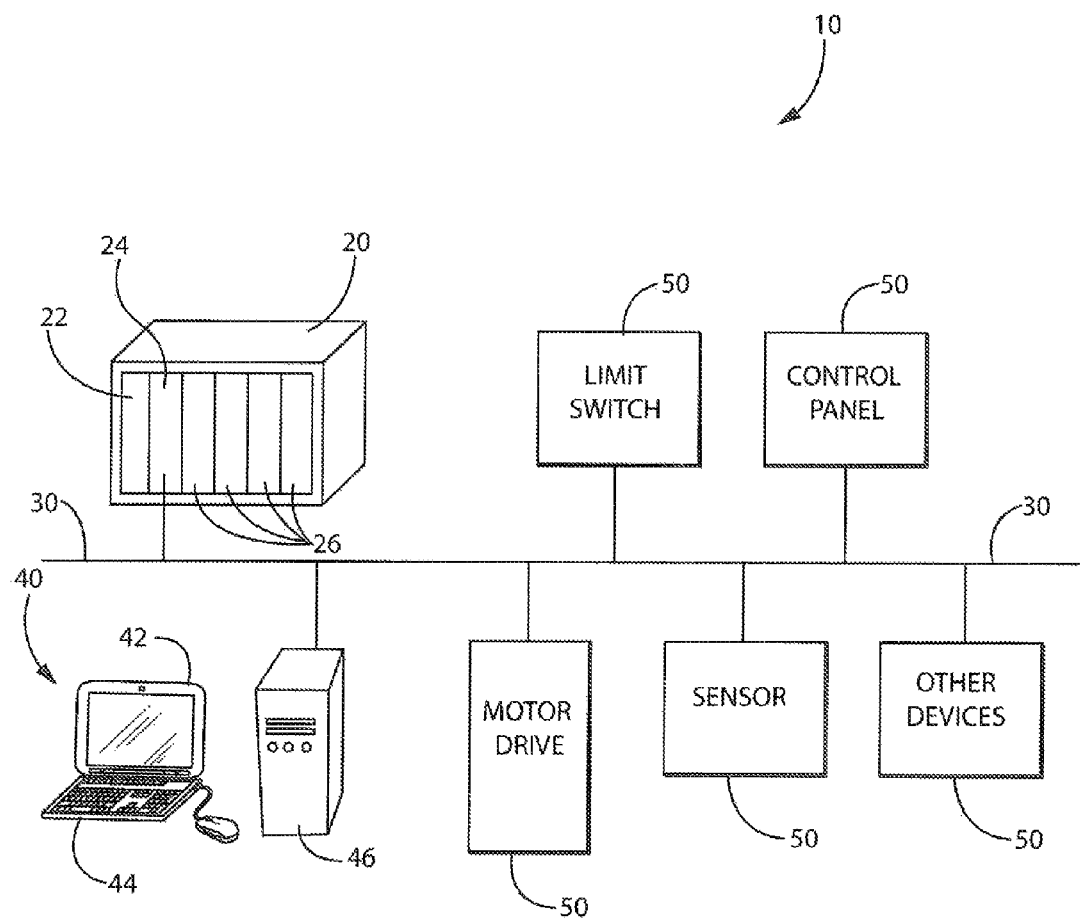
FIG. 1 is an exemplary control system incorporating one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Turning initially to FIG. 1, an exemplary industrial control system 10 includes a controller rack 20, a programmer interface 40, and multiple devices 50 connected via an industrial network 30. The controller rack 20 includes modules, for example, a power supply 22, an industrial controller 24, and I/O modules 26. The modules in a controller rack 20 may be connected, for example, via a power bus, communication bus, a backplane, or a combination thereof. It is contemplated that various other configurations of the controller rack 20 may be used without deviating from the scope of the invention, including, but not limited to, multiple racks, remote I/O modules, or fixed chassis configurations. The programmer interface 40 may be, but is not limited to, a stand-alone workstation or a human machine interface (HMI) having a display 42, a programmer input device 44, such as a keyboard, mouse, touchpad, touchscreen, or combination thereof, and a processing unit 46. Each of the elements of the programmer interface 40 may be separate components or they may be integrated into a single device such as a tablet computer. Each of the connections to the industrial network 30 may be made via a wired or a wireless connection. According to the illustrated embodiment, the devices 50 may be a motor drive, a limit switch, a control panel configured to receive operator input, a sensor, or any suitable device according to the application requirements. The devices 50 may be configured to provide input data to the industrial controller 24, perform actions as a function of output signals from the industrial controller 24, or a combination thereof. According to one embodiment of the invention, the industrial network 30 is an open network, allowing multiple vendors to configure devices 50 for communication on the network 30. Alternately, the industrial network 30 may be a proprietary network, backplane, or communication bus. A Common Industrial Protocol (CIP) is defined providing a uniform, high level definition of data messages transmitted via the network 30. The CIP may further be adapted such that the data messages may be transmitted via various network specific protocols such as EtherNet/IP, DeviceNet, or ControlNet.

Figure 2:
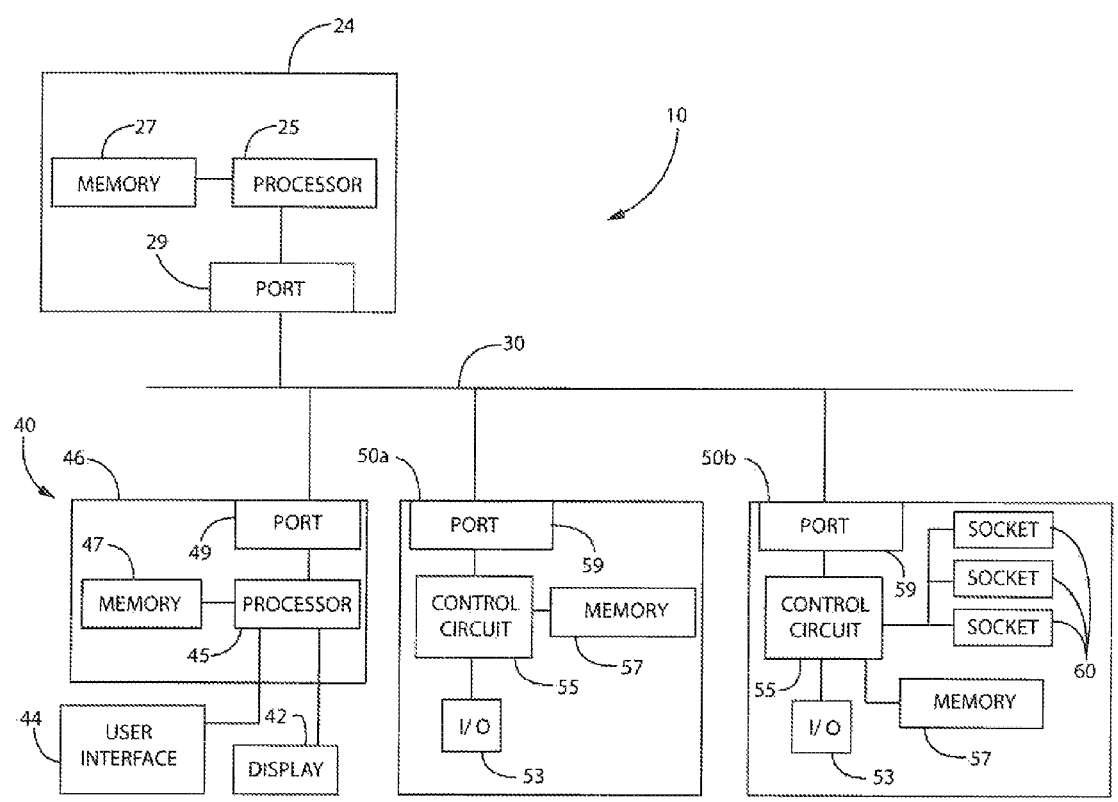
FIG. 2 is a partial block diagram of the control system of FIG. 1.

Referring next to FIG. 2, the industrial controller 24 includes a processor 25 and a memory device 27 in communication with the processor 25. It is contemplated that the processor 25 and memory device 27 may each be a single electronic device or formed from multiple devices. Optionally, the processor 25 and/or the memory device 27 may be integrated on a field programmable gate array (FPGA) or an application specific integrated circuit (ASIC). The memory device 27 is configured to store configuration data and a control program for the industrial control system. The processor 25 is configured to execute the control program for operation of a controlled industrial machine or process to which the industrial controller 24 is connected. The industrial controller 24 also includes a port 29 such as a network interface card in communication with the processor 25. The port 29 is connected to the industrial network 30 providing a connection between the industrial controller 24 and the programmer interface 40 and other devices 50 on the network 30. The stored control program reads signals from a portion of the devices 50 indicating the state of the industrial process or machine (from sensors or the like) and generates outputs to another portion of the devices 50 to control the industrial process or machine according to those sensed inputs and the logic of the control program. Industrial controllers 24 suitable for use with the present invention include, for example, programmable controllers commercially available from Rockwell Automation, Inc.

The programmer interface 40 includes a display 42 configured to provide information to an operator, a user interface 44 configured to receive input from the operator, and a processing unit 46. The processing unit 46 further includes a processor 45 and a memory device 47 in communication with the processor 45. It is contemplated that the processor 45 and memory device 47 may each be a single electronic device or formed from multiple devices. Optionally, the processor 45 and/or the memory device 47 may be integrated on a field programmable gate array (FPGA) or an application specific integrated circuit (ASIC). The memory device 47 may be configured to store configuration data for the industrial control system such as electronic data sheets (EDSs) 100, option data sheets (ODSs) 200, and a configuration program. The processing unit 46 also includes a port 49 such as a network interface card in communication with the processor 45. The port 49 is connected to the industrial network 30 providing a connection between the programmer interface 40 and the industrial controller 24 and other devices 50 on the network 30. The processor 45 is configured to execute the configuration program to receive input from the user interface 44, for example, to identify the devices 50 connected to the industrial network 30.

Each device 50 is configured to interface to the controlled machine or process via Inputs/Outputs (I/O) 53. The I/O 53 may be an electrical or mechanical interface with the controller machine or process or a combination thereof. The device may 50, for example, receive a signal from a transducer corresponding to a controlled parameter or drive an actuator to affect operation of the controlled machine or process. Each device 50 includes a control circuit 55 and a memory device 57 in communication with the control circuit 55. It is contemplated that the control circuit 55 may include discrete components such as a buffer to queue data packets and a dedicated circuit to convert data packets between input and/or output signals. The control circuit 55 may also include logic circuits to transmit signals between the I/O 53 on the device 50 and the port 59. Optionally, the control circuit 55 may include a microcontroller or a processor. It is contemplated that the control circuit 55 and memory device 57 may each be a single electronic device or firmed from multiple devices. Optionally, the control circuit 55 and/or the memory device 57 may be integrated on a field programmable gate array (FPGA) or an application specific integrated circuit (ASIC). The memory device 57 is configured to store an EDS 100 and ODSs 200 corresponding to the device 50. The device 50 also includes a port 59 providing a network interface in communication with the control circuit 55. The port 59 is connected to the industrial network 30 providing a connection between the device 50 and the programmer interface 40 and the industrial controller 24 on the network 30.

A device 50b may further be configurable according to modules that plug into the device. The device 50b includes sockets 60 configured to receive the modules. As discussed in more detail below, the device 50 may include an EDS describing the interface between the device 50 and the industrial controller 24. The EDS may include a list of options 140 corresponding, for example, to modules pluggable into the sockets 60 of the device 50. A separate ODS 200 may be provided for each module describing the additional interface between the industrial controller 24 and the device 50 as a result of the module that was inserted. According to an exemplary embodiment of the invention, a device 50 may have a socket 60 configured to receive a communication card as a module. Different communication cards may be supplied according to the industrial network 30 on which the device 50 communicates, including, but not limited to, EtherNet/IP, DeviceNet, or ControlNet. The EDS may define the communication card as an option 140 with EtherNet/IP, DeviceNet, or ControlNet each defined as a choice 150. Either a single ODS 200, including each choice 150, or separate ODSs 200 for each choice 150 may be provided identifying the settings, or logical interface, to permit the device 50 to communicate via each industrial network 30.

Figure 3:
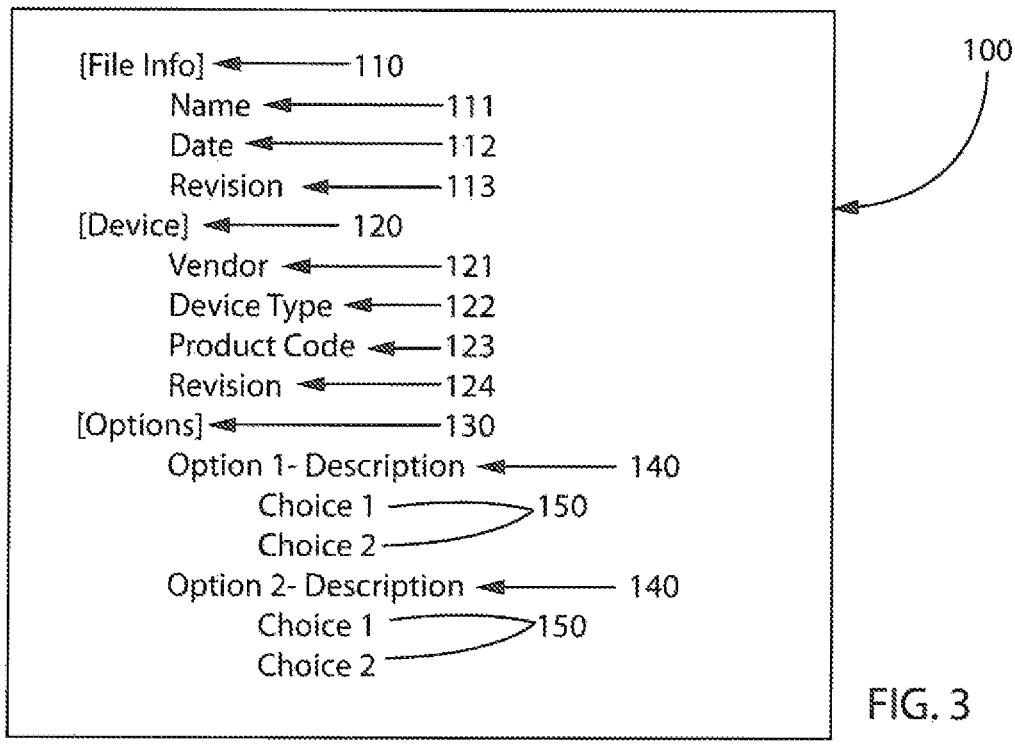
FIG. 3 is an exemplary electronic data sheet according to one embodiment of the present invention.
Figure 4:
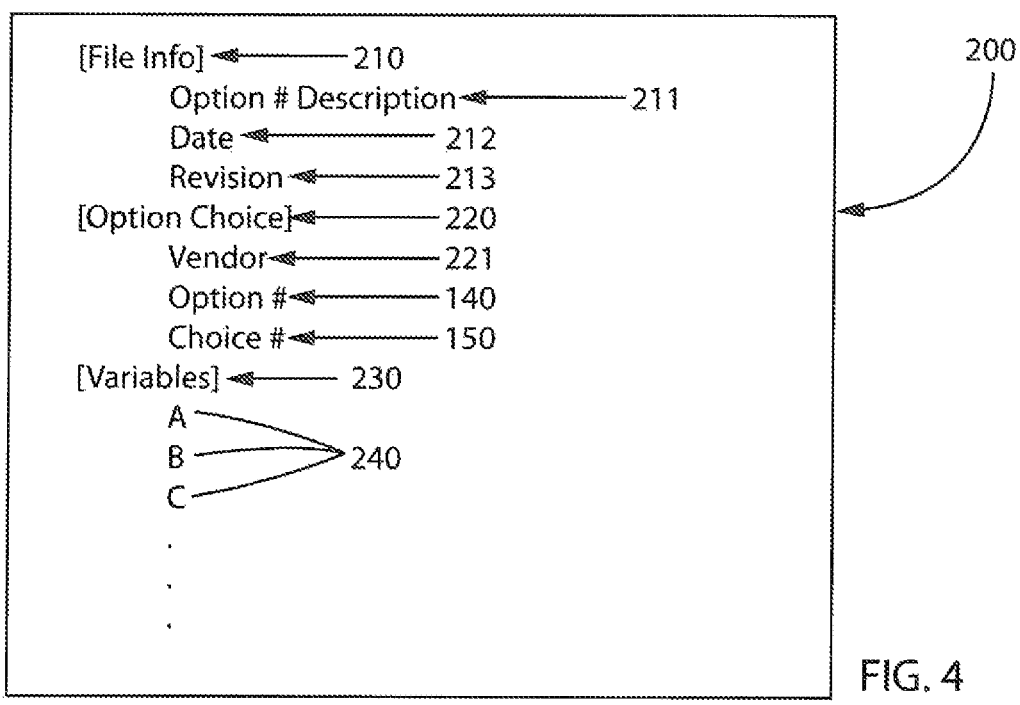
FIG. 4 is an exemplary option data sheet according to one embodiment of the present invention.

Referring next to FIGS. 3 and 4, each device 50 may have multiple options 140 and operation of the device 50 is dependent on the choices 150 selected for each option 140. An EDS 100 is provided for each type of device 50 which defines the logical interface of the device 50 to the industrial network 30. The logical interface may include, for example, connections, configuration, ports, and other attributes of the physical connection to or data transmitted via the network. The EDS 100 includes file information 110 that includes, for example, a file name 111, a date 112 the file was created, and a revision number 113 for the file. The EDS 100 also includes device information 120. The device information 120 identifies, for example, a vendor 121 of the device 50, a device type 122, a product code 123, and a revision number 124 of the device 50. The EDS 100 may also include an options section 130, defining options 140 available on the device 50. The EDS 100 defines each option 140 and further defines each choice 150 available for each option 140. It is contemplated that various other arrangements and configurations of the data presented in the EDS may be utilized without deviating from the scope of the invention.

According to one embodiment of the invention, an ODS 200 is provided for each choice 150 available for each option 140. The ODS 200 includes file information 210 that includes, for example, a file name 211, a date 212 the file was created, and a revision number 213 for the file. The ODS 200 also includes option information 220. The option information 220 identifies, for example, a vendor 221 of the device, the option 140 and the specific choice 150 corresponding to the ODS 200. The ODS 200 may also include one or more variable sections 230, defining variables 240 corresponding to the choice 150. The variables 240 defined by each ODS are dependent on the option 140 and on the choice 150 defined by the ODS 200. The variables may be, but are not limited to, connection data for one or more input and/or output points contained on the device 50 or configuration parameters defining, for example, the type of data or the size of data transmitted between the device 50 and another device 50 or the industrial controller 24 via the network 30. It is further contemplated that the ODS 200 may define still additional options 140 as well as the choices 150 available for the additional options 140. Various other arrangements and configurations of the data presented in the ODS may be utilized without deviating from the scope of the invention.

According to another embodiment of the invention, an ODS 200 is provided for each option 140. The ODS 200 includes file information 210 that includes, for example, a the name 211, a date 212 the file was created, and a revision number 213 for the file. The ODS 200 also includes option information 220. The option information 220 identifies, for example, a vendor 221 of the device, the option 140 and each of the choices 150 available for the option 140. The ODS 200 may also include one or more variable sections 230, defining variables 240 corresponding to the choices 150. The variables 240 defined by each ODS are dependent on the option 140 and on the choices 150 defined by the ODS 200. The variables may be, but are not limited to, connection data for one or more input and/or output points contained on the device 50 or configuration parameters defining, for example, the type of data or the size of data transmitted between the device 50 and another device 50 or the industrial controller 24 via the network 30. It is further contemplated that standard ODSs may be developed to describe choices of certain options. Common ODSs may be used between devices 50 which use the same option with the same choices reducing the number of tiles that are required to be stored.

During commissioning of an industrial controller 24, knowledge of the devices 50 connected to the industrial machine or process to be controlled must be obtained. It is contemplated that the EDSs 100 and ODSs 200 may be used to configure the industrial control system 10 using either online or offline configuration. According to one embodiment of the invention, the industrial control system 10 is configured via an offline configuration process. The programmer interface 40 stores a configuration program and each of the EDSs 100 and ODSs 200 in its memory device 47. The EDSs 100 and ODSs 200 may be stored in one or more directories to facilitate access or, alternately, a database may be populated with a list of EDSs 100 and ODSs 200 available in the memory device 47. Initially, a master list or a partial master list of devices 50 may be provided with the configuration program and the EDSs 100 and ODSs 200 associated with each of the devices 50 included in the full or partial master list are stored in the memory device 47. As new devices 50 are selected for use in the industrial control system 10, each of the EDSs 100 and ODSs 200 corresponding to the new device 50 are added to the memory device 47.

Once all of the devices 50 to be used in a particular industrial control system 10 have been selected, the processor 45 executes the configuration program to provide on the display 42 to an operator a list of devices 50 for which an EDS 100 is stored in the memory device 47. The operator selects one of the devices 50 used in the industrial control system 10 from the list using the user interface 44. The configuration program reads the EDS 100 corresponding to the selected device 50 to determine whether any options 140 are defined within the EDS 100. For each option 140 identified in the EDS 100, the configuration program provides a list of choices 150 on the display 42 to the operator. The operator selects the choice 150 for each option 140 corresponding to the configuration of the device 50 in the industrial control system 10. The configuration program then reads the ODS 200 corresponding to each selected choice to determine the variables defined in the ODS 200 corresponding to the configuration of the device 50 in the industrial control system 10. The steps of displaying the list of devices 50, selecting a device 50, displaying the list of choices 150 for each option 140, and selecting a choice 150 for each option 140 is repeated for each device 50 in the industrial control system 10. The configuration program compiles the variables 240 and generates a controller configuration file which includes each of the variables 240 defined in the ODSs 200 from each of the devices 50 in the industrial control system 10. The controller configuration file may be stored in the memory device 47 of the programmer interface 40 and also transmitted to the industrial controller 24 and stored in the memory device 27 of the industrial controller 24.

Having stored the controller configuration file in the industrial controller 24, the industrial controller 24 may be configured to execute a verification program, confirming the connections between the industrial controller 24 and each of the devices 50 as defined in the controller configuration file. The verification program may be executed each time a connection between the industrial controller 24 and a device 50 is established. The verification program generates an electronic key segment to be transmitted to each device 50 to verify that the device 50 supports the options 140 identified in the controller configuration file. According to one embodiment of the invention, the electronic key segment may be divided into two message packets. A first message packet includes data such as the vendor, type of device, and code for the device according to the information stored in the controller configuration file. A second message packet includes data corresponding to the options 140 selected for each device 50. The industrial controller 24 transmits the first and second message packets to each device 50. Optionally, the electronic key segment may be included in a single message packet having multiple segments. The control circuit 55 on each device 50 receives each message packet, compares the data to an identity object on the device 50. The identity object includes a list of the options present on the device 50. If the data matches, the device 50 returns a confirmation packet to the industrial controller 24. It is contemplated that various other configurations of message packets may be used to verify that the device 50 supports the options 140 identified in the controller configuration file without deviating from the scope of the invention.

The industrial controller 24 uses the controller configuration file in conjunction with the control program stored in the memory device 27 to control operation of the industrial machine or process to which it is connected. The variables 240 may include, for example, connection settings, port information, and/or data types for communication over the industrial network 30. The control program may require the status of one or more inputs from the devices 50 to subsequently set an output to energize or de-energize an actuator on another device 50. The control program may be implemented using numeric identifiers or variable names corresponding to an input or output on the device 50. The control program uses the numeric identifier or variable name linked to the data obtained from the EDS 100 or ODSs 200 such that the industrial controller 24 may communicate and process the data from an input or to an output.

According to another embodiment of the invention, the industrial control system 10 is configured via an online configuration process. Each of the devices 50 includes a memory device 57 in which the EDS 100 and any ODSs 200 corresponding to that device 50 are stored. Each of the devices 50 further includes a list of the choices for each option that are present on the device 50, such as the identity object stored in the device 50. If a new device is included in the industrial control system 10, the programmer interface 40 is configured to read the data from the list of choices, the EDS 100, and each ODS 200 stored in each device 50. The list of choices may be used to generate the controller configuration file, and the EDS 100 and each ODS 200 may be stored on the programmer interface 40 for future reference.

According to one embodiment of the invention, the programmer interface 40 executes a configuration routine to generate a message packet for transmission on the industrial network 30. The message packet may be configured to poll each device sequentially, in a multi-cast transmission, or a combination thereof. Optionally, a first message packet may be generated to identify devices 50 connected to the industrial network 30, their corresponding addresses, and/or to determine whether they are multi-option devices 50. For certain networks, a limited number of potential addresses are allowed. The programmer interface 40 may sequentially poll each address to retrieve the identity of each device 50 present at that address, where the identity may include the list of choices for each option. For other networks, the number of potential addresses is too large to practically poll each address. The programmer interface 40 may first generate a multi-cast transmission to locate at which addresses a device is present. The programmer interface 40 may then poll those addresses at which a device is present to retrieve the identity of the device 50 at that address.

Having obtained the identity and list of choices for a device 50 at an address on the network, the programmer interface 40 may automatically read the EDS 100 and each ODS 200 corresponding to the device 50 to obtain the logical interface to the device for each device identified on the network. Optionally, the programmer interface 40 may first prompt a programmer to verify which of the devices 50 present on the network that the programmer would like to include in the controller configuration file and subsequently read the EDS 100 and each ODS 200 corresponding to the selected devices 50. The configuration routine compiles the variables and generates the controller configuration file which includes each of the variables defined in the ODSs 200 from each of the devices 50 in the industrial control system 10. The controller configuration file may be stored in the memory device 47 of the programmer interface 40 and also transmitted to the industrial controller 24 of the industrial controller 24 and stored in the memory device 27 of the industrial controller 24.

According to yet another embodiment of the invention, the programmer interface 40 may be used to configure individual devices 50. As previously discussed, the device 50 includes a memory device 57 in which the EDS 100 and any ODSs 200 corresponding to that device 50 are stored. Each of the devices 50 further includes a list of the choices for each option that are present on the device 50, such as the identity object stored in the device 50. With reference to the earlier presented example, the device 50 may include a socket 60 configured to receive a communication card. The device identity indicates which type of communication is inserted into the device 50. The programmer interface 40 retrieves the EDS 100, ODS 200, and identity from the device 50 and presents a configuration screen to the programmer. The programmer selects, for example, a priority level, address, or other communication parameter as required according to the application requirements for the device 50. The programmer interface 40 then transmits the new configuration to the device 50 to be stored on the memory device 57.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. An industrial control system for controlling operation of an industrial machine or process, the industrial control system comprising:
   an industrial network;
   a plurality of devices, wherein each device:
      includes a device memory, and
      is operatively connected to the industrial network and to the industrial machine or process;
   an industrial controller operatively connected to the industrial network to communicate with the plurality of devices;
   a plurality of electronic data sheets, wherein:
      each electronic data sheet is a data file stored in the device memory of one of the devices,
      each electronic data sheet defines at least one option for the device, and
      each option includes a plurality of choices;
   a plurality of option data sheets, wherein:
      each option data sheet is a data file corresponding to one of the options defined in the plurality of electronic data sheets,
      each option data sheet is stored in the device memory corresponding to the device on which the electronic data sheet defining the option is stored, and
      each of the option data sheets defines at least one variable of the device that varies according to the plurality of choices for the option; and
   a programmer interface configured to:
      read each of the electronic data sheets from the device memory,
      read the plurality of choices for each option in the electronic data sheet,
      read each of the option data sheets from the device memory,
      generate a controller configuration file identifying the at least one variable for each option of each device connected to the industrial network as a function of the electronic data sheets, option data sheets, and the plurality of choices read from the devices, and
      transmit the controller configuration file to the industrial controller, wherein the industrial controller is configured to read the plurality of choices for each option present on each device and verify that the controller configuration file corresponds to the devices connected to the industrial network.

2. The industrial control system of claim 1 wherein each option data sheet defines the at least one variable for each of the plurality of choices corresponding to the option.

3. The industrial control system of claim 1 wherein each option data sheet defines the at least one variable for one of the plurality of choices corresponding to the option.

4. The industrial control system of claim 1 wherein at least one of the option data sheets defines at least one additional option for the device, each additional option having a plurality of choices.

5. The industrial control system of claim 1 further comprising a plurality of modules, wherein each module is selectively connected to one of the plurality of devices operatively connected to the network, wherein the electronic data sheet corresponding to the device defines at least one option for the module.

6. A programmer interface for an industrial control system, the industrial control system including a plurality of devices, each device operatively connected to an industrial machine or process and each device in communication with an industrial network, the programmer interface comprising:
   a network interface configured to communicate via the industrial network;
   a non-transient programmer memory storing a plurality of electronic data sheets and a plurality of option data sheets in the programmer interface, wherein:
      each electronic data sheet is a data file corresponding to one of the devices,
      each electronic data sheet defines at least one option for the device,
      each option includes a plurality of choices;
      each option data sheet is a data file corresponding to one of the options defined in the plurality of electronic data sheets, and
      each of the option data sheets defines at least one variable of the device that varies according to the plurality of choices for the option;
   a display configured to display data to a programmer,
   an input device configured to receive input from the programmer, and
   a processor configured to execute a stored program to
      read the electronic data sheet and option data sheets corresponding to each of the plurality of devices connected to the industrial control system,
      generate a configuration file identifying the at least one variable for each option of each device connected to the industrial network as a function of the electronic data sheets, plurality of choices, and option data sheets corresponding to each of the plurality of devices connected to the industrial control system, and
      transmit the configuration file to one of an industrial controller configured to control operation of the plurality of devices and a device connected to the industrial network.

7. The programmer interface of claim 6 wherein the industrial control system includes an industrial controller configured to control operation of the plurality of devices and wherein the configuration file is a controller configuration file which is transmitted via the industrial network to the industrial controller after it is generated.

8. The programmer interface of claim 6 wherein the configuration file is a device configuration file and wherein the device configuration file is transmitted via the industrial network to the device after it is generated.

9. A method of configuring communications between a controller and a plurality of devices, wherein the controller and each of the devices are connected via an industrial network and wherein the controller is configured to execute a program for controlling an industrial machine or an industrial process as a function of the plurality of devices connected to the controller via the industrial network, the method comprising the steps of:
   identifying each of the plurality of devices connected to the industrial network with a programmer interface;
   reading a plurality of electronic data sheets with the programmer interface, wherein:
      each electronic data sheet is a data file stored in a device memory of one of the plurality of devices,
      each electronic data sheet defines at least one option for the device, and
      each option includes a plurality of choices;
   determining a choice selected from the plurality of choices for each option defined in the electronic data sheet of each of the plurality of devices via the programmer interface;
   reading a plurality of option data sheets with the programmer interface, wherein each option data sheet is a data file stored in the device memory corresponding to the device on which the electronic data sheet defining the option is stored and wherein each option data sheet corresponds to one of the selected choices and defines at least one variable of the device that varies according to the selected choice;
   generating a controller configuration file with the programmer interface for the controller identifying each of the variables defined in each of the option data sheets corresponding to the choices selected for each of the options of each of the devices connected to the industrial network;
   transmitting the controller configuration file from the programmer interface to the controller;
   reading the plurality of choices from each device for each option present on the device with the controller; and
   verifying that the controller configuration file corresponds to the devices connected to the industrial network.

10. The method of claim 9 wherein each device further includes a list of choices for each option present on the device, and
   determining the choice selected for each option includes reading the list of choices present on the device.

11. The method of claim 9 wherein identifying each of the plurality of devices further comprises selecting each of the devices from a list displayed on a display of the programmer interface, wherein the programmer interface also includes a programmer memory configured to store the electronic data sheets and the option data sheets, an input device configured to receive input from a programmer, and a processor configured to generate the controller configuration file.

12. The method of claim 11 wherein the plurality of electronic data sheets are read from the programmer memory responsive to the devices selected from the list displayed on the programmer interface.

13. The method of claim 12 wherein determining the choice selected for each option further comprises:
   displaying each of the options defined in the electronic data sheets for the corresponding devices on the display; and
   receiving the input from the programmer corresponding to the choice selected for each option.

14. The method of claim 13 wherein the plurality of option data sheets are read from the programmer memory responsive to the choices selected by the programmer.

* * * * *